(12) United States Patent
Valkonen et al.

(10) Patent No.: US 6,809,756 B1
(45) Date of Patent: Oct. 26, 2004

(54) SYSTEM FOR MONITORING A PROCESS

(75) Inventors: Mika Valkonen, Aanekoski (FI); Jorma Snellman, Saynatsalo (FI); Juha Toivonen, Jyvaskyla (FI)

(73) Assignee: Honeywell Oy (FI)

( * ) Notice: Subject to any disclaimer, the term of this patent is extended or adjusted under 35 U.S.C. 154(b) by 0 days.

(21) Appl. No.: 09/488,981

(22) Filed: Jan. 21, 2000

(30) Foreign Application Priority Data

Jan. 22, 1999 (FI) .................................................. 990120

(51) Int. Cl.$^7$ ................................................ H04N 7/18
(52) U.S. Cl. ........................... 348/88; 348/92; 348/94; 348/125; 348/128; 348/129; 382/149; 382/141; 382/108; 382/112; 702/35; 702/36; 702/40; 356/429; 356/430; 356/431; 356/237; 356/238
(58) Field of Search .......................... 348/88, 87, 86, 348/125–128, 92–94, 132, 129; 382/149, 108, 141, 110–112; 702/35–36, 40; 356/429–431, 238, 237

(56) References Cited

U.S. PATENT DOCUMENTS

| 4,951,223 | A | * | 8/1990 | Wales et al. ................... 702/40 |
| 5,011,573 | A | | 4/1991 | Niemi ......................... 162/198 |
| 5,239,376 | A | | 8/1993 | Dittmann et al. ............ 358/101 |
| 5,260,780 | A | | 11/1993 | Staudt, III ................... 358/107 |
| 5,305,099 | A | | 4/1994 | Morcos ........................ 348/88 |
| 5,622,602 | A | * | 4/1997 | Yakabe et al. ................ 348/88 |
| 5,821,990 | A | * | 10/1998 | Rudt et al. .................... 348/88 |
| 5,870,203 | A | | 2/1999 | Chiu et al. ................... 356/430 |
| 5,899,959 | A | * | 5/1999 | Shields et al. ................ 348/88 |
| 6,266,437 | B1 | * | 7/2001 | Eichel et al. ............... 382/149 |
| 6,330,343 | B1 | * | 12/2001 | Johnson et al. ............. 382/100 |
| 6,340,412 | B1 | * | 1/2002 | Niemi ........................ 382/108 |
| 6,388,749 | B1 | * | 5/2002 | Yamashita et al. .......... 356/430 |

FOREIGN PATENT DOCUMENTS

| EP | 0837323 | 4/1998 |
| WO | 9737494 | 10/1997 |
| WO | WO 9846826 | 10/1998 |

\* cited by examiner

Primary Examiner—Shawn S. An
(74) Attorney, Agent, or Firm—Ostrolenk, Faber, Gerb & Soffen, LLP

(57) ABSTRACT

The invention relates to a method for monitoring a process. The image information received from cameras monitoring various positions of the process is stored in digital form and various cameras positions are alternately selected for a display and analysis on the screen of a computer. The screen is also used for displaying an image variation graph representing the image variation data of images preceding and following the image to be analyzed. The system includes selector elements (5) for selecting a camera position representing the highest-level image variation for an automated display.

2 Claims, 2 Drawing Sheets

SYSTEM FOR MONITORING A PROCESS

BACKGROUND OF THE INVENTION

1. Field of the Invention

The present invention relates to a method for monitoring a process, said system comprising a number of cameras for imaging various positions in a presently monitored process;

digital image processors for storing digital image information as per camera and for analyzing each camera-specific image information so as to provide image variation data based on the level of variation in several sequential images; and a display or screen which can be used for selecting images stored from various cameras positions for analysis, while using the screen for displaying an image variation graph representing the image variation data of images preceding and following the image to be analyzed.

2. Description of the Related Art

Prior to the present invention, the system designed by the Applicant has been operated by using software for selecting a given break in a paper web for analysis, wherefor the system displays all stored icons of camera positions on the analyzing window of a computer screen (FIG. 2 shows a printout of this window). In addition, the image material of all camera positions is used for composing an image variation graph 8 (one for each camera position) visible at the bottom of the picture shown in FIG. 2, which represents image variation data based on the level of variation in sequential images. The user selects his or her chosen camera position by means of selector icons 7. Thus, the user is compelled to examine several different camera positions and to compare those with each other prior to being able to locate image data representing the highest-level variation and an image variation graph consistent therewith.

SUMMARY OF THE INVENTION

It is an object of the invention to provide an improved system, wherein the image variation graph representing the highest-level variation and the image data of a camera position consistent therewith can be selected automatically for display on an analyzing window. This object is achieved by the invention on the basis of the characterizing features set forth and claimed herein. One exemplary embodiment of the invention will now be described in more detail with reference to the accompanying drawings, in which

DETAILED DESCRIPTION OF EMBODIMENTS OF THE INVENTION

Figure 1:
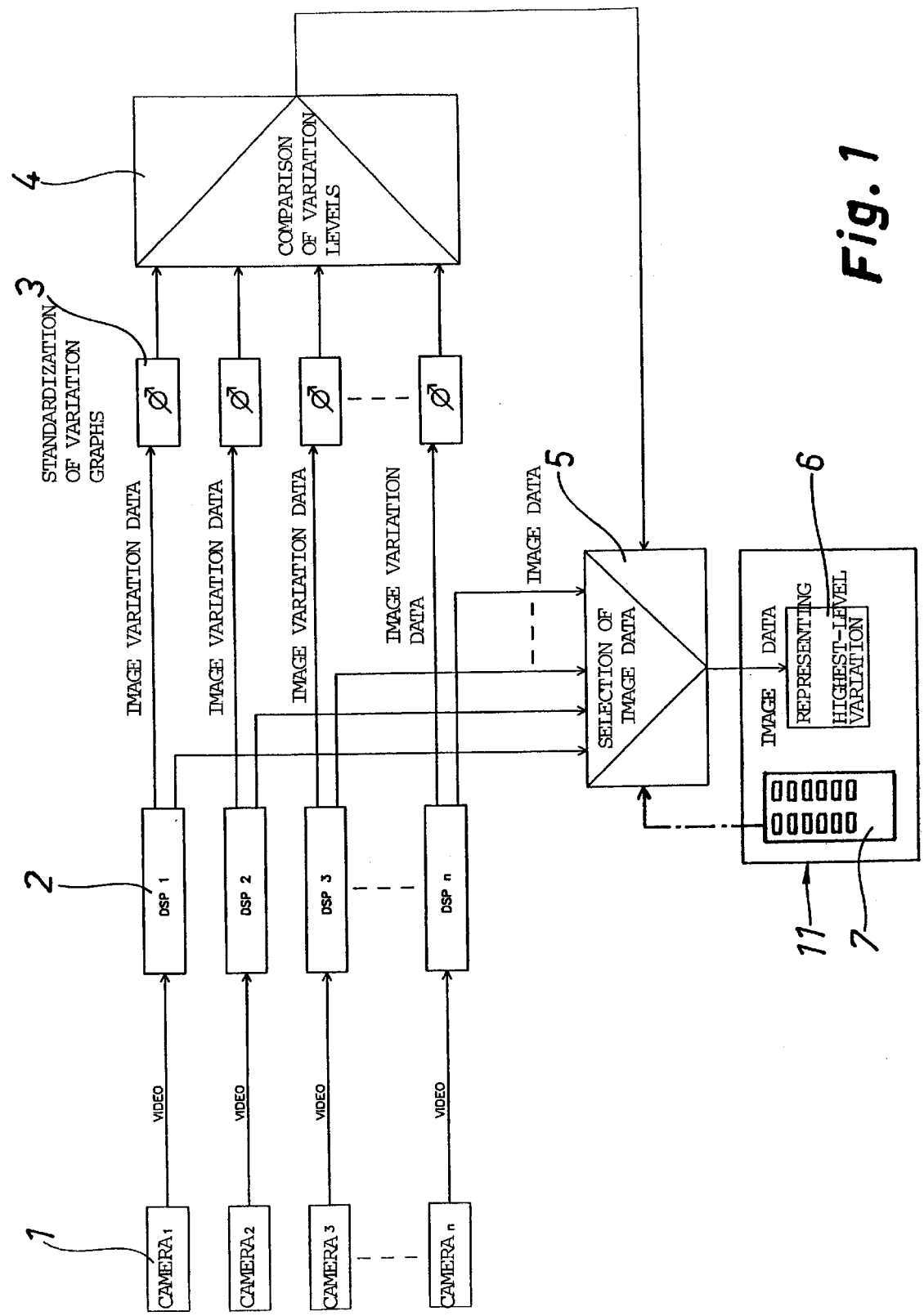
FIG. 1 shows a system of the invention in a block diagram.

An image source in the block diagram of FIG. 1, comprises a video camera 1, which produces continuously a video image of a presently monitored object. The image information is processed in a digital signal processor 2 or a DSP processor (digital signal processor). The signal processors are like ordinary microprocessors, but contain among other features the service of floating-point number technology and address formats for easier addressing. Furthermore, the DSP is markedly different from the ordinary processor in terms of its architecture, having been designed for duties involving plenty of data, and in which multiplying with integers and data transfers and statistically significant operations. The DSP processors are capable of performing a plurality of different and simultaneous calculation routines associated with image analysis, the results of which can be applied automatically to monitoring changes or variations occurring in image information.

The system includes a number of video cameras 1 for imaging various positions of a presently monitored process. Each camera is provided with its own separate image processor 2 for storing digital image information as per camera. The signal processors 2 are used for analyzing each camera-specific image information so as to provide image variation data based on the level of variation in a plurality of sequential images. From the signal processors 2, said image data and image variation data is transmitted to an analyzing computer, having a display or screen 11 which is shown more specifically in FIG. 2.

Figure 2:
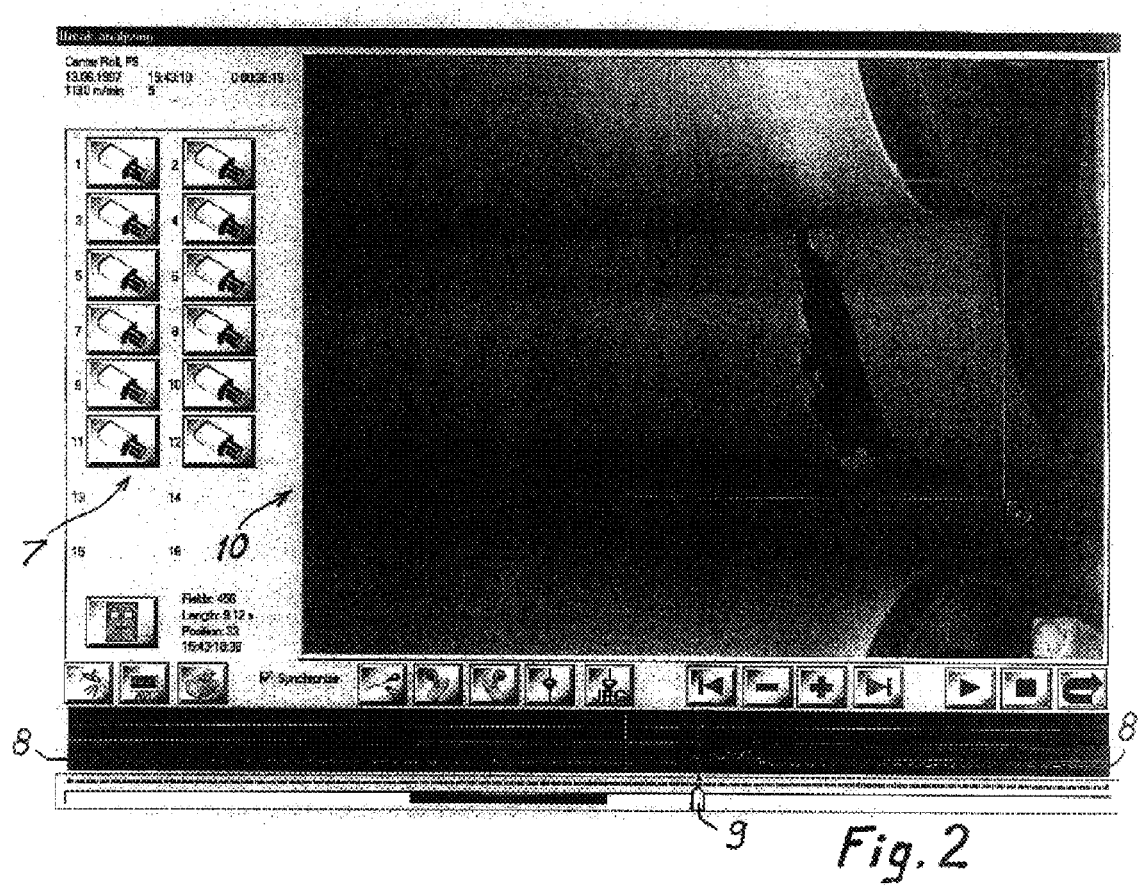
FIG. 2 shows an analyzing window present on a computer screen in the system, whereby the user is able to analyze a process variation incident.

The icons 7 visualized in FIG. 2 can be used for choosing images stored at various camera positions for analysis. The image variation graph 8 consistent with the image variation data of images preceding and following the image to be analyzed is displayed at the bottom of the screen. A floating arrow designated by reference numeral 9 indicates the point along the image variation graph 8 that a displayed image 10 is located at. The floating arrow 9 can be used for selectively displaying any image present along the graph 8. The image data stored from each camera position may encompass several hundred images. Depending on a process, the image data in store at any given moment of time may have a duration which ranges from a few seconds to several minutes, and the storage may function on a FIFO (first in first out) principle.

Since it is the image material from all camera positions which is used for composing the image variation graph 8 visible at the bottom of FIG. 2, the image variation graphs of various camera positions can be made comparable by standardization and be compared with each other, whereby the image variation graph representing the highest-level variation and the image data of a camera position consistent therewith can be automatically chosen to be displayed on the analyzing window of the screen 11. For the purpose of this automation, the system is provided with stardardizing devices 3 for standardizing the output levels of the image variation data of various camera positions to be mutually comparable. A comparison between the image variation levels of various camera positions is performed by means of comparator elements 4. Selector elements 5 receive image data from various camera positions and choose, under the control of the comparator elements 4, image data 6 representing the highest-level variation and the corresponding image variation graph 8 to be displayed on the screen 11. An image 10 is one of a multitude of images included in the image data. The graph 8 and the floating indicator 9 can be used for examining those very images 10 associated with the site of the highest-level image variation. In the exemplary case of FIG. 2, the image 10 on the screen 11 represents a hole developed in a paper web.

Naturally, the automated selection of the invention is such that, according to his or her wishes, the user is able to choose image data from any camera position for analysis. However, it is often beneficial that the user has knowledge at the very beginning of analysis as to which camera position produced the highest-level image variation, whereby the analysis can be started from this particular camera position.

What is claimed is:

1. A system for monitoring a process, said system comprising a number of cameras (1) for imaging various positions in a presently monitored process;

digital image processors (2) for storing digital image information as per camera and for analyzing each camera-specific image information so as to provide image variation data based on the level of variation in several sequential images; and a display or screen (11) which can be used for selecting images (10) stored from various camera positions for analysis, while using the screen (11) for displaying an image variation graph (8) representing the image variation data of images preceding and following the image (10) to be analyzed, characterized in that the system comprises standardizing devices (3) for standardizing the output levels of the image variation data from various camera positions to be mutually comparable;

comparator elements (4) for a mutual comparison between said standardized image variation data from various camera positions; and selector elements for selecting the camera position with the highest-level image variation for automated display;

said selector elements (5) being in communication with the digital image processors (2) for receiving image data from various camera positions, and said comparator elements (4) being adapted to control the selector elements (5) in such a way that the image data representing the highest-level variation and the image variation graph (8) consistent therewith are selected for an automated display on the screen (11).

2. A system as set forth in claim 1, characterized in that the process comprises papermaking and the object of monitoring comprises a paper web traveling in a paper machine.

* * * * *